United States Patent [19]

Kawakami et al.

[11] 4,062,626
[45] Dec. 13, 1977

[54] LIQUID CRYSTAL DISPLAY DEVICE

[75] Inventors: Hideaki Kawakami, Mito; Yutaka Yoneda, Hitachi; Yoshiharu Nagae, Hitachi; Masaaki Kitazima, Hitachi, all of Japan

[73] Assignee: Hitachi, Ltd., Japan

[21] Appl. No.: 610,781

[22] Filed: Sept. 5, 1975

[30] Foreign Application Priority Data

Sept. 20, 1974 Japan .................. 49-107746
Oct. 16, 1974 Japan .................. 49-118128

[51] Int. Cl.² ............... G02F 1/18; G08B 5/36; G09F 9/32
[52] U.S. Cl. ............... 350/160 LC; 340/324 M; 340/336
[58] Field of Search ............ 350/160 LC; 340/336, 340/324 M

[56] References Cited

U.S. PATENT DOCUMENTS

| 3,781,865 | 12/1973 | Yamazaki | 340/336 |
| 3,902,169 | 8/1975 | Washizuka | 350/160 LC |
| 3,922,667 | 11/1975 | Ueda et al. | 340/324 M |

FOREIGN PATENT DOCUMENTS 2,343,373  3/1974  Germany ............ 350/160 LC

*Primary Examiner*—John K. Corbin
*Assistant Examiner*—Rolf Hille
*Attorney, Agent, or Firm*—Craig & Antonelli

[57] ABSTRACT

A liquid crystal display device in which an electronic switch having a double threshold characteristic is combined with each of a plurality of liquid crystal cells, and an ac signal voltage and an ac bias voltage are applied to one and the other terminals respectively of the combined circuit of the liquid crystal cells and electronic switches. In the device, the electronic switches are turned on or off depending on the relation between the phase of the signal voltage and that of the bias voltage so that the liquid crystal cells can be excited for display by the voltage applied thereacross in response to the turn-on of the electronic switches.

17 Claims, 27 Drawing Figures

BIAS VOLTAGE

SIGNAL VOLTAGE

VLC

PERIOD 16  PERIOD 17
OFF         ON

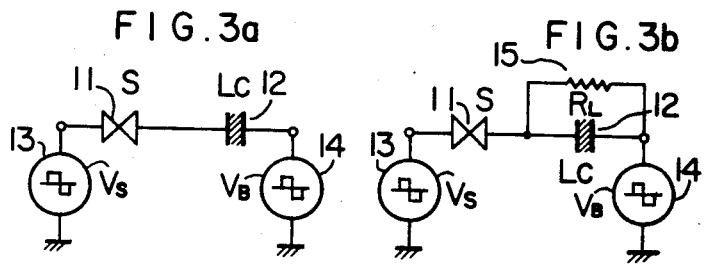
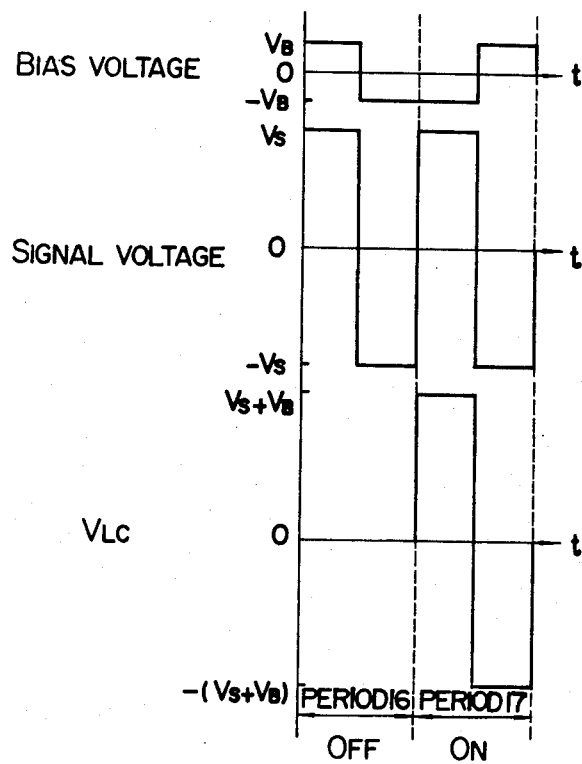

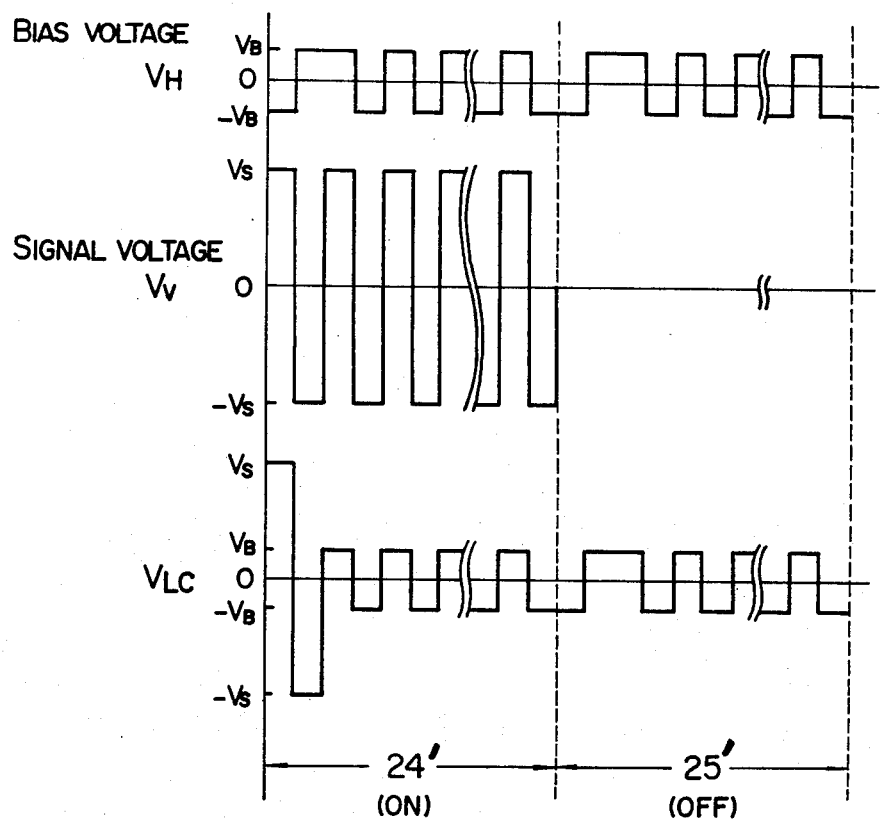

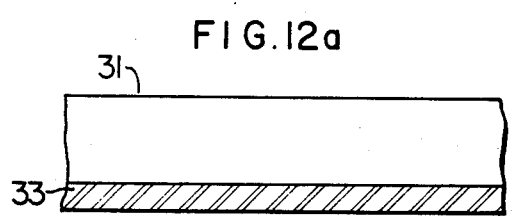
FIG.12a
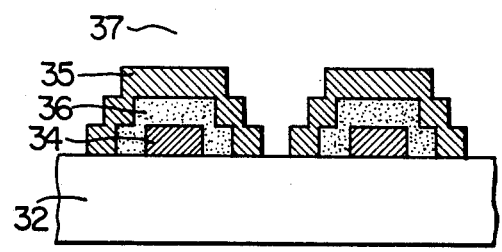
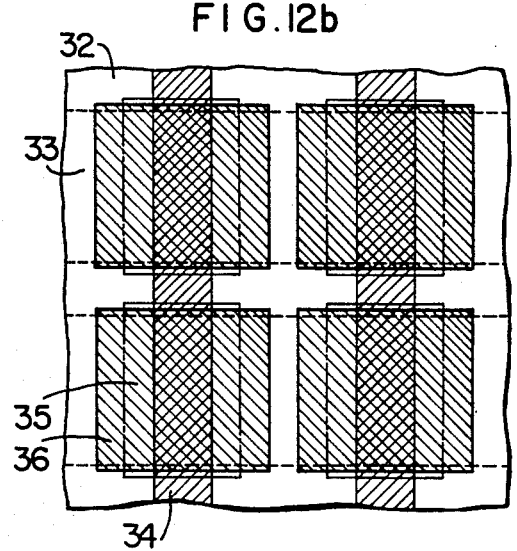
FIG.12b

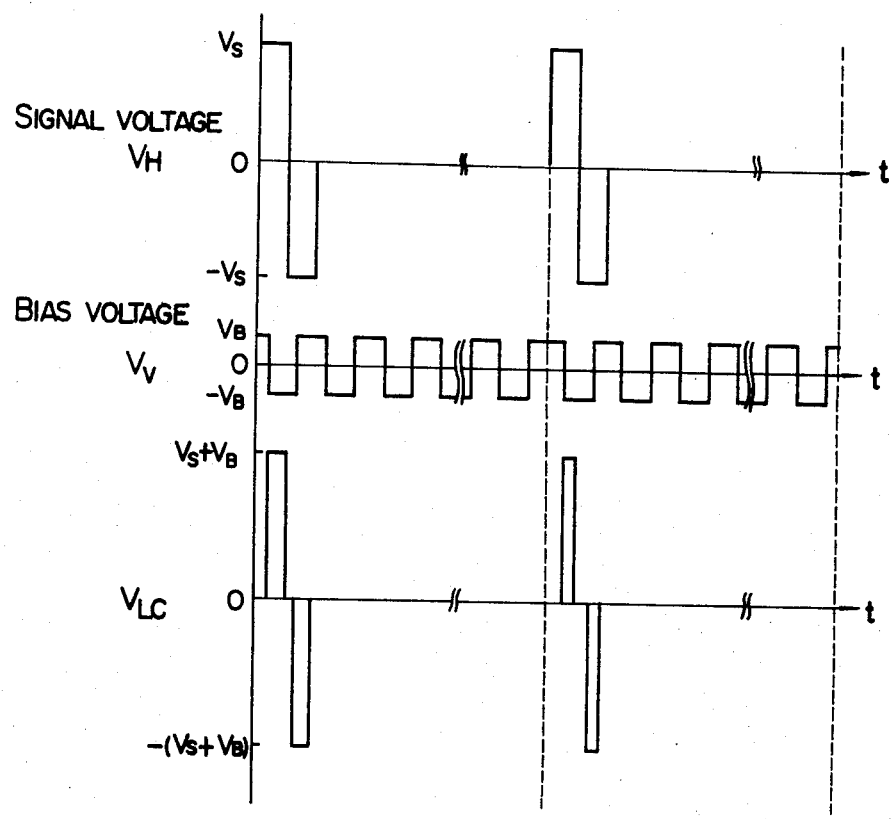

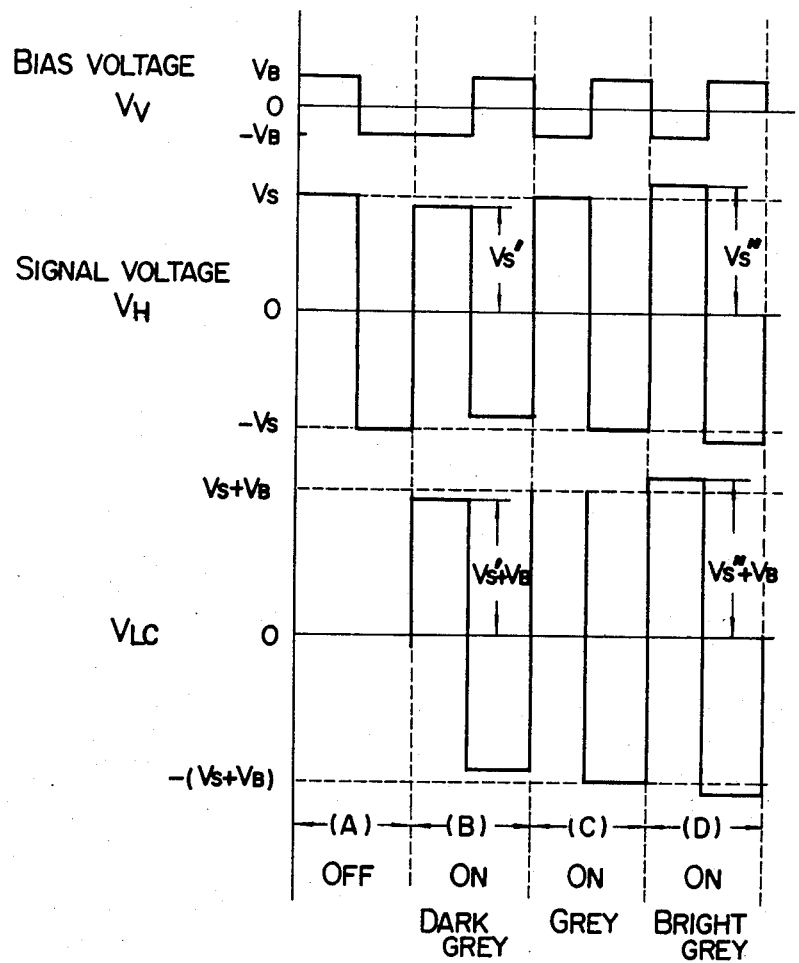

LIQUID CRYSTAL DISPLAY DEVICE

This invention relates to a liquid crystal display device in which a liquid crystal cell and an electronic switch are connected to each other to constitute a display element.

Crosstalk is a serious problem in a liquid crystal display device, especially in a device of this kind in which groups of X-electrodes and Y-electrodes are arranged in matrix form. In the liquid crystal display device, voltage is applied to the picture elements existing at the intersections of the X-electrodes and Y-electrodes selected from the electrode groups in the matrix for exciting the selected picture elements for display. The crosstalk refers to a phenomenon in which other unnecessary picture elements are also excited by leakage current in the course of excitation of the desired picture elements.

In an effort to obviate this undesirable crosstalk, a method has been proposed which uses a picture element composed of a liquid crystal cell and an electronic switch. In such a method, a semiconductive glass material having a switching function is employed to form the electronic switch. One form of prior art liquid crystal display devices based on the above proposal comprises a plurality of picture elements each consisting of a series connection of a liquid crystal cell and a switch of semiconductive glass having a switching function. A dc voltage is applied continuously to all these picture elements, and the semiconductive glass switches are connected to X-electrodes and Y-electrodes arranged in matrix form. Pulse voltages of opposite signs are applied to the X-electrodes and Y-electrodes respectively to selectively turn on the semiconductive glass switches so that the dc voltage can be applied only to the liquid crystal cells corresponding to the selected switches. Thus, the selected liquid crystal cells can only be excited, for display.

In another form of prior art liquid crystal display devices, a plurality of picture elements each consisting of a series connection of a liquid crystal cell and a semiconductive glass switch are connected to X-electrodes and Y-electrodes arranged in matrix form. A voltage of +E volts is applied to selected ones of the X-electrodes, and a voltage of −E volts is applied to selected ones of the Y-electrodes, while no voltage or zero volts is applied to the remaining non-selected electrodes, so that the voltage of 2E volts can be applied to the selected picture elements. The semiconductive glass switches in the selected picture elements are thereby turned on to excite the associated liquid crystal cells for display.

Although the undesirable crosstalk can be effectively eliminated by the arrangements above described, the prior art liquid crystal display devices are defective in that the liquid crystal is relatively rapidly deteriorated due to the fact that the dc voltage is applied continuously thereto. Further, the known liquid crystal display devices are not capable of giving sufficient picture display since circuit means suitable for giving halftone display have not been developed yet.

It is therefore an object of the present invention to provide a novel and improved liquid crystal display device which minimizes undesirable early deterioration of the liquid crystal and which can operate with a low voltage of ac waveform.

Another object of the present invention is to provide a liquid crystal display device which can operate free from the crosstalk occurred in the prior art devices when the liquid crystal cells are arranged in matrix form.

Still another object of the present invention is to provide a liquid crystal display device which can easily display halftone.

In accordance with the present invention, there is provided a liquid crystal display device comprising a liquid crystal cell, an electronic switch having a double threshold characteristic, said electronic switch being connected in series with said liquid crystal cell, means for applying an ac signal voltage to one terminal of the series circuit of said liquid crystal cell and said electronic switch, and means for applying an ac bias voltage to the other terminal of said series circuit, said electronic switch being turned on or off depending on the relation between the phase of said ac signal voltage and that of said ac bias voltage, whereby said liquid crystal cell is excited for display when said electronic switch is turned on.

The present invention is advantageous in that no crosstalk occurs during operation and deterioration of the liquid crystal is reduced to a minimum since no dc voltage is applied to the liquid crystal.

The present invention will now be explained in detail in conjunction with the accompanying drawings, in which:

FIGS. 3a and 3b are circuit diagrams showing basic structures of two preferred embodiments of the present invention;

FIG. 4 is a waveform diagram illustrating the operation of the devices shown in FIGS. 3a and 3b;

FIG. 11 is a waveform diagram illustrating a manner of actuating the liquid crystal display panel shown in FIG. 10;

FIGS. 12a and 12b are a sectional view and a plan view respectively showing a practical structure of the liquid crystal display panel shown in FIG. 7a;

FIG. 17 is a waveform diagram similar to FIG. 16a but showing practical waveforms appearing during line-by-line scanning on the liquid crystal display panel;

FIG. 21 is a waveform diagram illustrating a manner of displaying halftone by applying amplitude modulation, to the signal voltage applied to the display panels shown in FIGS. 7a and 7b.

Figure 1:
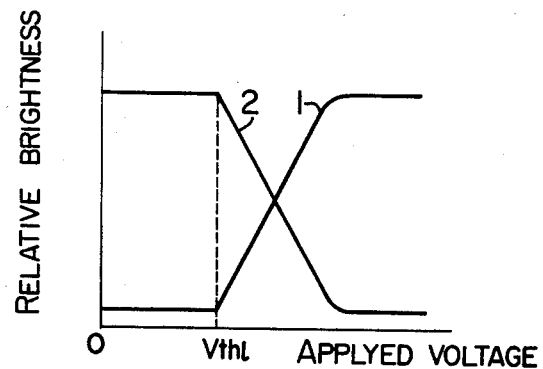
FIG. 1 is a graph showing the electro-optical characteristic of a liquid crystal.

Brightness of liquid crystals varies generally relative to an applied voltage in a manner as shown by the characteristic curves 1 and 2 in FIG. 1. According to the characteristic curve 1 shown in FIG. 1, the brightness of liquid crystals starts to increase when the applied voltage exceeds a threshold level $V_{thl}$, and saturation is finally reached at a high brightness level, while according to the characteristic curve 2, the brightness of liquid crystals starts to decrease when the applied voltage exceeds the threshold level $V_{thl}$ and saturation is finally reached at a low brightness level. Liquid crystals of dynamic scattering mode or normally closed type liquid crystals of twisted nematic mode are known which have a brightness characteristic represented by the characteristic curve 1, and normally open type liquid crystals of twisted nematic mode are known which have a brightness characteristic represented by the characteristic curve 2. In anyone of these brightness characteristics, the brightness starts to increase or decrease when the threshold level $V_{thl}$ is exceeded, and the liquid crystals operate in a similar fashion from the electrical point of view. Therefore, description given hereinafter will be directed solely to liquid crystals having a brightness characteristic represented by the characteristic curve 1 in FIG. 1.

Electronic switches employed in the present invention have a double threshold characteristic such that the resistance thereof is changed over from a high level $R_{OFF}$ (off state) to a low level $R_{ON}$ (on state) when the absolute value of applied voltage exceeds a predetermined limit, and the resistance thereof is restored to the original high level $R_{OFF}$ again when the value of current flowing therethrough is reduced to less than a predetermined limit.

Figure 2:
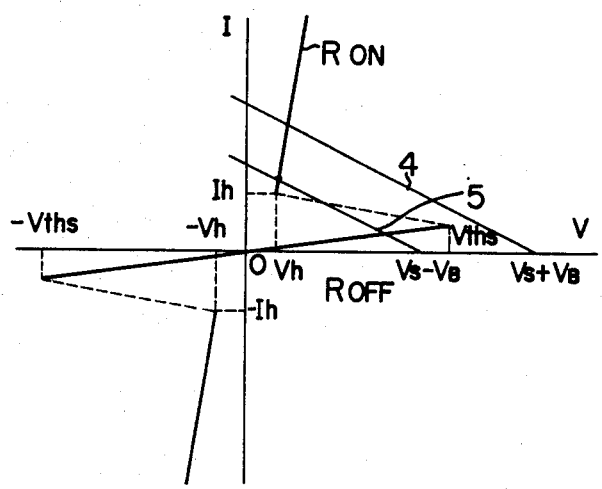
FIG. 2 is a graph showing the operating characteristic of an electronic switch employed in the present invention.

The operation of electronic switches having such a double threshold characteristic will be described in more detail with reference to FIG. 2. Referring to FIG. 2, a high resistance $R_{OFF}$ (off state) appears when an applied voltage is increased from zero (point O), and this high resistance $R_{OFF}$ is changed over to a low resistance $R_{ON}$ (on state) when the applied voltage exceeds a predetermined limit $V_{ths}$. This low resistance $R_{ON}$ persists relative to the voltage and current as shown. The low resistance $R_{ON}$ is changed over to the high resistance $R_{OFF}$ again when the applied voltage is decreased and current is reduced to less than a limit $I_h$ (corresponding to a voltage $V_h$). The operation of the electronic switches in response to the application of a negative voltage is entirely similar to that above described, and change-over from $R_{OFF}$ to $R_{ON}$ and from $R_{ON}$ to $R_{OFF}$ occurs at the points of applied voltage and current of $-V_{ths}$ and $-I_h$ respectively.

The electronic switches having such characteristic can be easily formed from amorphous semiconductors such as chalcogenide glasses which are Ge-Si-As-Te compounds. The values of $R_{OFF}$, $R_{ON}$, $V_{ths}$ and $I_h$ must be suitably selected depending on the electro-optical properties of liquid crystals and the number of liquid crystals forming a matrix as described later, and such values can be freely selected by suitably selecting the composition, method of manufacture and shape of the chalcogenide glass. For further detail, refer to the paper of S. R. Ovshinsky et al. entitled "Amorphous Semiconductors for Switching, Memory and Imaging Applications" I.E.E.E. Trans. on Electron Devices, Vol. E.D. 20, No. 2 (1973).

FIGS. 3a and 3b are circuit diagrams showing the basic structures of two preferred embodiments of the present invention. In FIGS. 3a and 3b, reference numerals 11, 12, 13, 14 and 15 designate an electronic switch of the type above described, a liquid crystal cell, a source of signal voltage $V_S$, a source of bias voltage $V_B$, and a load resistor, respectively.

The operation of the circuits shown in FIGS. 3a and 3b will be described with reference to FIG. 4 which shows the waveforms of bias voltage $\pm V_B$ applied from the source 14, signal voltage $\pm V_S$ applied from the source 13, and voltage $V_{LC}$ applied across the liquid crystal cell 12.

The operation of the circuit shown in FIG. 3a will be described at first. When the liquid crystal cell 12 is not excited, the phase of the bias voltage $V_S$ applied from the source 14 is the same as that of the signal voltage $V_S$ applied form the source 13 during a period 16 as seen in FIG. 3a. Therefore, a voltage given by $\pm (V_S - V_B)$ is applied across the series circuit of the electronic switch 11 and the liquid crystal cell 12. The values of $V_S$ and $V_B$ are selected so that, in such a case, the load line in the electronic switch 12 agrees with the position of a line 5 shown in FIG. 2. Thus, the electronic switch 12 remains in the off state and no voltage is applied across the liquid crystal cell 12, that is, the terminal voltage $V_{LC}$ of the liquid crystal cell 12 is $V_{LC} \approx 0$.

When it is desired to excite the liquid crystal cell 12 for display, the phase of the bias voltage $V_B$ applied from the source 14 is inverted relative to that of the signal voltage $V_S$ applied from the source 13 as seen during a period 17 in FIG. 4. Therefore, a voltage given by $\pm (V_S + V_b)$ is applied across the series circuit of the electronic switch 11 and liquid crystal cell 12. The values of $V_S$ and $V_B$ are selected so that, in such a case, the load line in the electronic switch 11 agrees with the position of another line 4 shown in FIG. 2. Thus, the electronic switch 12 is placed in the on state, and a voltage $V_{LC} \approx + (V_S + V_B)$ is applied across the liquid crystal cell 12 when the voltage drop across the electronic switch 11 is disregarded. This voltage $(V_S + V_B)$ applied across the liquid crystal cell 12 is selected to satisfy the relation $V_S + V_B > V_{thl}$ where $V_{thl}$ is the threshold level of the liquid crystal, and thus, the liquid crystal cell 12 is excited to give a high brightness. In this manner, white or black display can be presented by controlling the phase of the bias voltage $V_B$ relative to that of the signal voltage $V_S$.

If the impedance $Z_{LC}$ of the liquid crystal cell 12 and the resistance value $R_{OFF}$ of the electronic switch 11 in the off state were such as to give the relation $|Z_{LC}| \approx R_{OFF}$, the exciting voltage might be applied across the liquid crystal cell 12 to excite the same for display even when the electronic switch 11 is kept turned off. Therefore, in the case in which the liquid crystal cell 12 has such a high impedance, it is necessary to connect a load resistor 15 in parallel with the liquid crystal cell 12 as shown in FIG. 3b. In this case, the resistance value $R_L$ of the load resistor 15 is selected to satisfy the relation $R_{OFF} >> R_L >> R_{ON}$. Further, due to the fact that current greater than the limit $I_h$ shown in FIG. 2 must be supplied in order to maintain the electronic switch 11 in the on state, it is necessary to hold the following relationship among the applied voltages, current limit and resistance of load resistor 15:

$$I_h < \frac{V_S + V_B - V_h}{R_L} \quad (1)$$

That is, the resistance value $R_L$ of the load resistor 15 must satisfy the following relation:

$$R_L < \frac{V_S + V_B - V_h}{I_h} \quad (2)$$

It will thus be seen that the liquid crystal display devices having the circuit structures shown in FIGS. 3a and 3b are advantageous in that the voltage level of the signal voltage and bias voltage applied to the display devices can be reduced since the liquid crystal cell can be excited by the sum of these voltages. Further, the voltage applied across the liquid crystal cell is approximately zero except the case in which the phase of the bias voltage is inverted relative to that of the signal voltage for exciting the liquid crystal cell. Furthermore, the liquid crystal in the liquid crystal display devices shown in FIGS. 3a and 3b is substantially free from undesirable deterioration due to the fact that no dc voltage component is applied across the liquid crystal cell.

Figure 5:
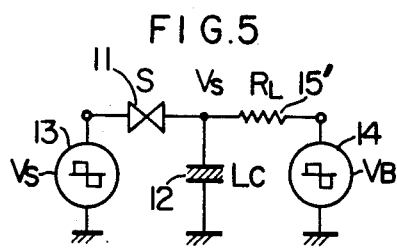
FIG. 5 is a circuit diagram showing the basic structure of another preferred embodiment of the present invention.
Figure 6:
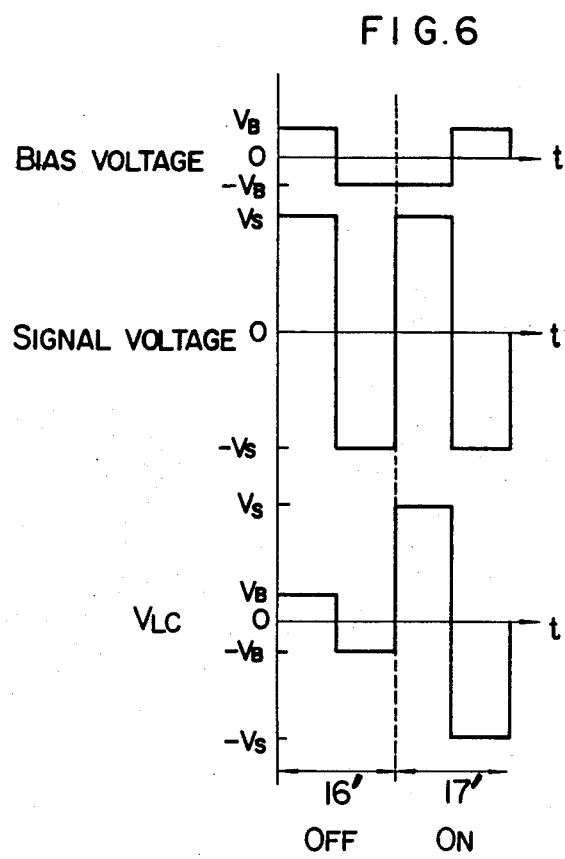
FIG. 6 is a waveform diagram illustrating the operation of the device shown in FIG. 5.

FIG. 5 shows the basic structure of another preferred embodiment of the present invention, and the operation thereof will be described with reference to FIG. 6. The embodiment shown in FIG. 5 is a modification of the embodiments shown in FIGS. 3a and 3b and differs from the latter in that the source 13 of signal voltage $\pm V_S$ only is directly connected to the series circuit of the electronic switch 11 and liquid crystal cell 12, and the source 14 of bias voltage $\pm V_B$ is connected in parallel with the liquid crystal cell 12 through a load resistor 15'.

The manner of display by the embodiment shown in FIG. 5 is also similar to that of the embodiments shown in FIGS. 3a and 3b. Thus, when the liquid crystal cell 12 is not excited, the phase of the bias voltage $V_B$ applied from the source 14 is the same as that of the signal voltage $V_S$ applied from the source 13 within a period 16' as seen in FIG. 6. When it is desired to excite the liquid crystal cell 12 for display, the phase of the bias voltage $V_B$ is inverted relative to that of the signal voltage $V_S$ as seen in a period 17' in FIG. 6. The operation of the electronic switch 11 in this latter case is entirely similar to that described with reference to FIGS. 3a and 3b, but the voltage $V_{LC}$ applied across the liquid crystal cell 12 is $\pm V_S$ when selected and $\pm V_B$ when non-selected as seen in FIG. 6.

In this embodiment, therefore, the signal voltage $V_S$ must be selected to satisfy the relation $V_S > V_{thl}$ where $V_{thl}$ is the threshold level of the liquid crystal cell 12. Further, the resistance value $R_L'$ of the load resistor 15' must be selected to satisfy the relation $$R_{LC}, R_{OFF} >> R_L' >> R_{ON} \quad (3)$$

where $R_{LC}$ is the internal resistance of the liquid crystal cell 12. Furthermore, the resistance value $R_L'$ of the load resistor 15' must satisfy the relation $$R_L' < \frac{V_S + V_B - V_h}{I_h} \quad (4)$$

for the same reason as that described with reference to FIGS. 3a and 3b.

The liquid crystal display device having the circuit structure shown in FIG. 5 is similarly advantageous in that any voltage higher than the threshold level of the liquid crystal is not applied across the liquid crystal cell except the case in which the phase of the bias voltage is inverted relative to that of the signal voltage for exciting the liquid crystal cell. Further, no dc voltage component is applied across the liquid crystal cell.

Figure 7A:
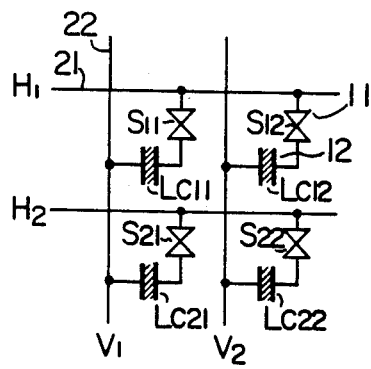
FIGS. 7a and 7b are equivalent circuit diagrams of preferred liquid crystal display panels of matrix form according to the present invention.
Figure 7B:
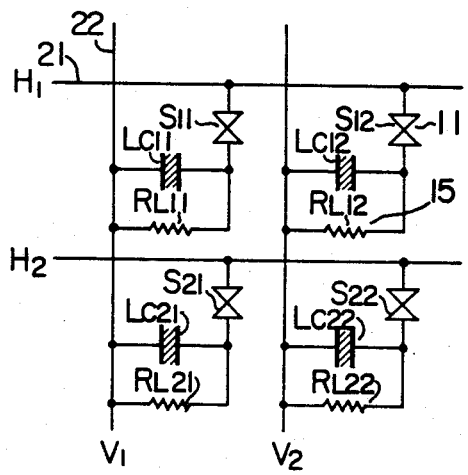

FIG. 7a shows an equivalent circuit of a liquid crystal display panel in which a plurality of picture elements each including the electronic switch and liquid crystal cell in the embodiment shown in FIG. 3a are arranged in matrix form, and FIG. 7b shows an equivalent circuit of a liquid crystal display panel in which a plurality of picture elements each including the electronic switch, liquid crystal cell and load resistor in the embodiment shown in FIG. 3b are arranged in matrix form. Referring to FIG. 7a, the series circuits each consisting of the electronic switch 11 and liquid crystal cell 12 shown in FIG. 3a are connected at one terminal thereof to a horizontal scanning line 21 and at the other terminal thereof to a vertical signal line 22 to provide the picture elements. Referring to FIG. 7b, the circuits each consisting of the electronic switch 11, liquid crystal cell 12 and load resistor 15 shown in FIG. 3b are similarly connected to a horizontal scanning line 21 and a vertical signal line 22 to provide the picture elements.

Figure 8:
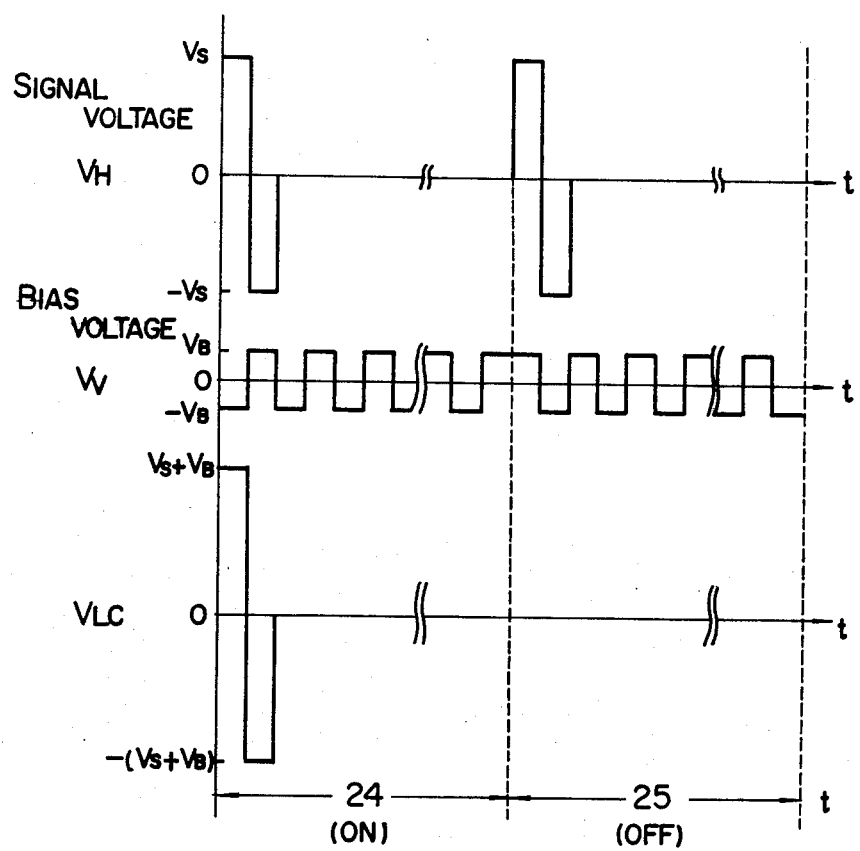
FIG. 8 is a waveform diagram illustrating a manner of actuating the liquid crystal display panels shown in FIGS. 7a and 7b.

FIG. 8 is a waveform diagram illustrating a manner of actuating the liquid crystal display panels shown in FIGS. 7a and 7b according to line-by-line scanning. Referring to FIG. 8, $V_H$ represents the waveform of signal voltage $\pm V_S$ applied to a selected one of the horizontal scanning lines 21 shown in FIGS. 7a and 7b, $V_V$ represents the waveform of bias voltage $\pm V_B$ applied to a selected one of the vertical signal lines 22 shown in FIGS. 7a and 7b, and $V_{LC}$ represents the waveform of voltage $\pm (V_S + V_B)$ applied across the liquid crystal cell in the picture element existing at the intersection of the selected horizontal scanning line 21 and selected vertical signal line 22. Thus, the signal voltage $\pm V_S$ is applied to a selected horizontal scanning line 21 when a specific liquid crystal cell is selected, and no signal voltage is applied to this horizontal scanning line 21 when this specific liquid crystal cell is not selected. On the other hand, the bias voltage $\pm V_B$ of phase opposite to that of the signal voltage $\pm V_S$ is applied to the associated vertical signal line 22 during a period 24 as shown in FIG. 8 when the selected liquid crystal cell is excited for display. The phase of this bias voltage $\pm V_B$ is the same as that of the signal voltage $\pm V_S$ during a period 25 as shown in FIG. 8 when the specific liquid crystal cell is not excited. As a result, the voltage $\pm (V_S + V_B)$ is applied, during the selected portion only of the period 24, across the liquid crystal cell in the picture element existing at the intersection of the selected lines 21 and 22. Therefore, the values of $V_S$ and $V_B$ required for exciting the liquid crystal cell for display are selected so that the effective voltage $V_{LC}$ appearing in this period is higher than the threshold level $V_{thl}$ of the liquid crystal cell. More precisely, the values of $V_S$ and $V_B$ are selected to satisfy the relation $$V_S + V_B > \sqrt{N} \cdot V_{thl} \tag{5}$$

where $N$ is the number of horizontal scanning lines 21.

It will thus be seen that the liquid crystal display panels shown in FIGS. 7a and 7b are excited by a signal voltage and a bias voltage of ac waveform. This is advantageous in that voltage across the liquid crystal cells in the picture elements except selected ones is substantially zero, and no crosstalk occurs in the liquid crystal display device.

Figure 9:
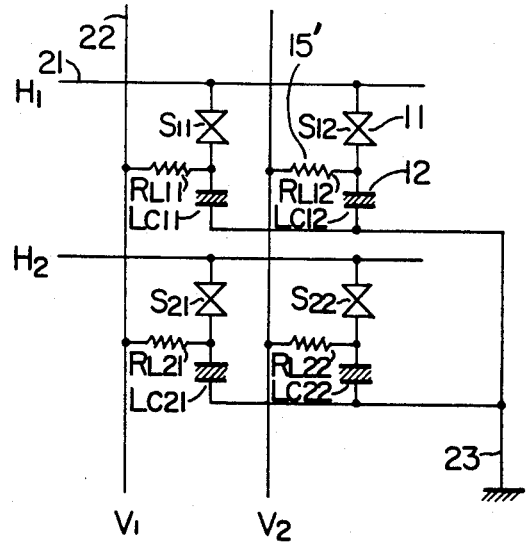
FIGS. 9 and 10 are equivalent circuit diagrams of other preferred liquid crystal display panels of matrix form according to the present invention.

FIG. 9 shows an equivalent circuit of a liquid crystal display panel consiting of a plurality of picture elements each of which has the circuit structure shown in FIG. 5. In the liquid crystal display panel shown in FIG. 9, the electronic switches 11 and load resistors 15' in the individual picture elements are connected to corresponding horizontal scanning lines 21 and vertical signal lines 22 respectively, while all the liquid crystal cells 12 are connected in common to a grounding line 23. This liquid crystal display panel can be actuated according to the principle of line-by-line scanning in a manner similar to that described with reference to FIG. 8, and it is unnecessary to give any further detailed description.

Figure 10:
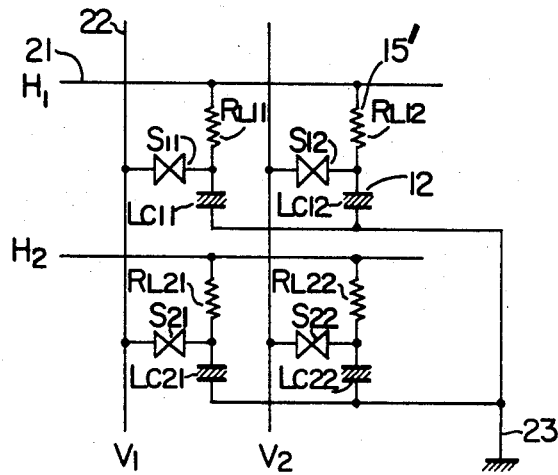

In FIG. 8 showing the manner of actuation of the liquid crystal display panels shown in FIGS. 7a and 7b, the signal voltage $\pm V_S$ is used as a scanning signal for the line-by-line scanning. However, the bias voltage $\pm V_B$ may be used for the line-by-line scanning. In such a case, the liquid crystal display panel shown in FIG. 9 has an arrangement as shown in FIG. 10. Referring to FIG. 10, the load resistors 15' in the individual picture elements are connected to the corresponding horizontal scanning lines 21, and the electronic switches 11 in the individual picture elements are connected to the corresponding vertical signal lines 22.

The manner of actuation of the liquid crystal display panel shown in FIG. 10 will be described with reference to FIG. 11. Referring to FIG. 11, $V_V$ represents the waveform of signal voltage $\pm V_S$ applied to a selected one of the vertical signal lines 22 shown in FIG. 10, $V_H$ represents the waveform of bias voltage $\pm V_B$ applied to a selected one of the horizontal scanning lines 21 shown in FIG. 10, and $V_{LC}$ represents the waveform of voltage $\pm (V_S + V_B)$ applied across the liquid crystal cell in the picture element existing at the intersection of the selected horizontal scanning line 21 and selected vertical signal line 22. Thus, the signal voltge $\pm V_S$ is applied to the selected vertical signal line 22 during a period 24' only for exciting the specific liquid crystal cell for display, and such voltage is not applied during a period 25' in which the specific liquid crystal cell is not excited. On the other hand, the bias voltage $\pm V_B$ of phase opposite to that of the signal voltage $\pm V_S$ is applied to the selected horizontal scanning line 21 when the specific liquid crystal cell is excited for display. The phase of this bias voltage $\pm V_B$ is the same as that of the signal voltage $\pm V_S$ when the specific liquid crystal cell is not excited. As a result, the voltage $V_{LC} = \pm (V_S + V_B)$ is applied across the liquid crystal cell in the picture element existing at the intersection of the selected lines 21 and 22. The values of $V_S$ and $V_B$ required for exciting the liquid crystal cell for display are selected so that the effective value of the voltage $V_{LC}$ appearing during the period 24' is higher than the threshold level $V_{th}$ of the liquid crystal cell.

FIGS. 12a and 12b are a sectional view and a plan view respectively of the liquid crystal display panel shown by the equivalent circuit in FIG. 7a. Referring to FIGS. 12a and 12b, electrodes 33 are deposited in stripe pattern on an upper sheet 31 to provide the vertical signal lines 22. Electrodes 34 are similarly deposited in stripe pattern on a lower sheet 32 to provide the horizontal scanning lines 21, and an amorphous semiconductor layer 36 and an intermediate electrode 35 are deposited on each of the lower electrode 34. These layers may be deposited as by evaporation or printing.

Figure 13A:
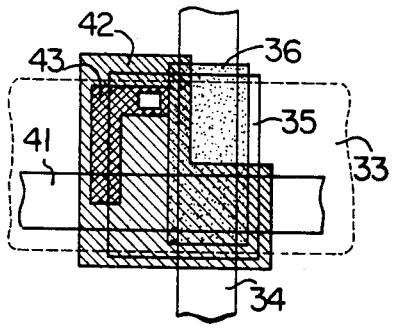
FIGS. 13a and 13b are a plan view and a sectional view respectively showing a practical structure of the liquid crystal display panel shown in FIG. 7b.
Figure 13B:
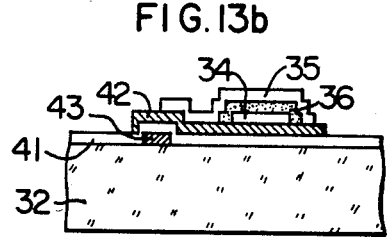

FIGS. 13a and 13b shown the structure of the liquid crystal display panel shown by the equivalent circuit in FIG. 7b. The structure of this liquid crystal display panel is similar to that shown in FIGS. 12a and 12b except for a minor difference in the structure of the lower panel portion. FIGS. 13a and 13b are a plan view and a sectional view respectively of the lower panel portion. Referring to FIGS. 13a and 13b, an auxiliary electrode 41 is deposited on a lower sheet 32 in such a relation that it extends in parallel with the corresponding one of upper electrodes 33. This auxiliary electrode 41 is shorted to the corresponding upper electrode 33 to provide one of the vertical signal lines 22. A lower electrode 34 is deposited normal to the auxiliary electrode 41 to provide one of the horizontal scanning lines 21. An amorphous semiconductor layer 36 is deposited on the lower electrode 34 and is connected in series with a liquid crystal layer through an intermediate electrode 35. A resistor 43 is connected between the intermediate electrode 35 and the auxiliary electrode 41, and the remaining unnecessary portions are insulated by an electrical insulating layer 42. Thus, the intermediate electrode 35, the upper electrode 33, and the liquid crystal layer interposed between these electrodes constitute a liquid crystal cell unit having a circuit structure as shown in FIG. 7b.

The liquid crystal display panel shown by the equivalent circuit in FIG. 9 differs from that shown in FIG. 7b in that the liquid crystal cells in all the picture elements are connected at one end thereof in common to the grounding line 23. Therefore, this liquid crystal display panel can be easily obtained by modifying the structure of the liquid crystal display panel shown in FIGS. 13a and 13b. More precisely, the structure of the lower panel portion may be similar to that shown in FIGS. 13a and 13b, and all the upper electrodes 33 may be disconnected from the auxiliary electrodes 41 to be connected in common to a single grounding line.

Figure 14:
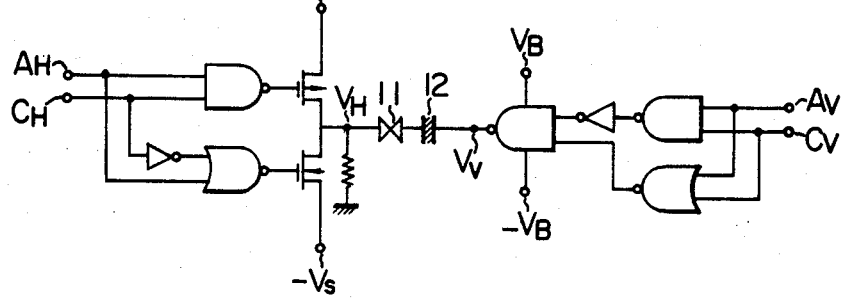
FIG. 14 is a circuit diagram of an actuating circuit employed preferably for providing the actuating waveforms shown in FIG. 8.

FIG. 14 shows an actuating circuit which may be preferably used to provide the exciting voltage waveforms shown in FIG. 8. Referring to FIG. 14, address signals $A_H$, $A_V$ and clock signals $C_H$, $C_V$ are applied to the circuit for providing the horizontal scanning signal $V_H$ and vertical signal $V_V$. These signals have a relation as shown in Table 1.

Table 1

| Address | Clock | $C_H$ | | $C_V$ | |
|---|---|---|---|---|---|
| | | 1 | 0 | 1 | 0 |
| $A_H$ | 1 | $V_S$ | $-V_S$ | $-V_B$ | $V_B$ |
| or $A_V$ | 0 | 0 | 0 | $V_B$ | $-V_B$ |
| | | $V_H$ | | $V_V$ | |

It will be seen from Table 1 that the horizontal scanning signal $V_H = \pm V_S$ is obtained when the address signal $A_H$ is in a 1 level, and the sign thereof varies depending on the level of the clock signal $C_H$. In the case of the vertical signal $V_V$, the phase thereof corresponding to the address signal $A_V$ of 1 level is opposite to that when the address signal $A_V$ is of 0 level. The phase of $V_V$ is opposite to that of $V_H$ when $A_V = 1$, and the phase of $V_V$ is the same is that of $V_H$ when $A_V = 0$. Thus, the voltage $\pm (V_S + V_B)$ is applied across the liquid crystal cell to excite the same for display when $A_V = 1$, and such voltage is not applied across the liquid crystal cell when $A_V = 0$.

The connection of the output lines of the actuating circuit shown in FIG. 14 may be suitably modified to obtain the voltage waveforms shown in FIG. 11 in which the phase of the bias voltage $\pm V_B$ relative to that of the signal voltage $\pm V_S$ is utilized for the line-by-line scanning.

Figure 15:
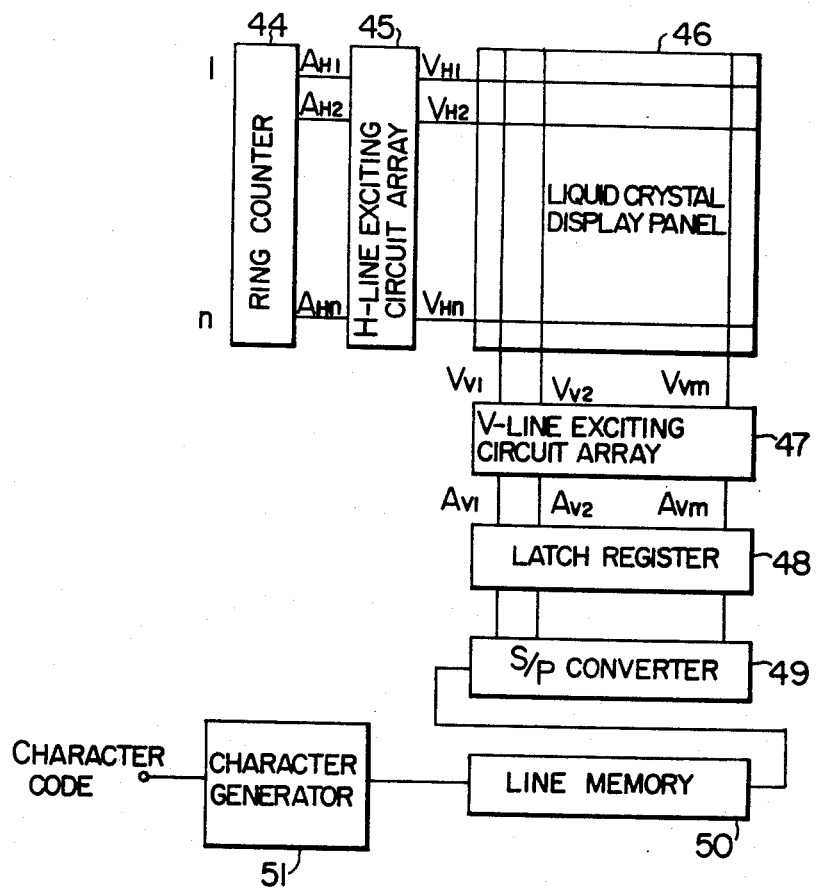
FIG. 15 is a block diagram of a character display apparatus to which the present invention is applied.

FIG. 15 shows the general arrangement of a character display apparatus using the liquid crystal display device described hereinbefore.

Referring to FIG. 15, reference numeral 46 designates a liquid crystal display panel having a structure as shown in FIG. 7a or 7b or FIG. 9. A horizontal line exciting circuit array 45 and a vertical line exciting circuit array 47 are connected to the liquid crystal display panel 46. Individual circuits of these circuit arrays corresponding to individual picture elements have a structure as described with reference to FIG. 14. An n-bit ring counter 41 delivers n outputs $A_{H1}$ to $A_{Hn}$ for successively energizing the circuits of the horizontal line exciting circuit array 45 thereby providing a horizontal scanning signal as shown by $V_H$ in FIG. 8. Character codes specifying characters to be displayed on the liquid crystal display panel 46 are applied to a character generator 51, and signals representing successive line portions of the characters to be displayed on the liquid crystal display panel 46 are applied sequentially to a line memory 50 from the character generator 51. The display signal corresponding to one line portion of the character display is subjected to series-parallel conversion by a series-parallel converter 49 to be stored in parallel relation in a latch register 48. During the period of time in which the ring counter 44 is specifying one line, the latch register 48 applies vertical line address signals $A_{V1}$ to $A_{Vm}$ to the vertical line exciting circuit array 47 to specify the output of the vertical line exciting circuit array 47. As a result, a vertical signal as shown by $V_V$ in FIG. 8 is obtained on the basis of the relation shown in Table 1. The content of the latch register 48 is renewed for storing the next line in synchronism with the period of counting operation of the ring counter 44. Such an operation is repeated for each of n lines so that the desired characters can be displayed on the liquid crystal display panel 46 according to the specified arrangement.

The liquid crystal display panel of the present invention can also be used for displaying halftone.

Figure 16A:
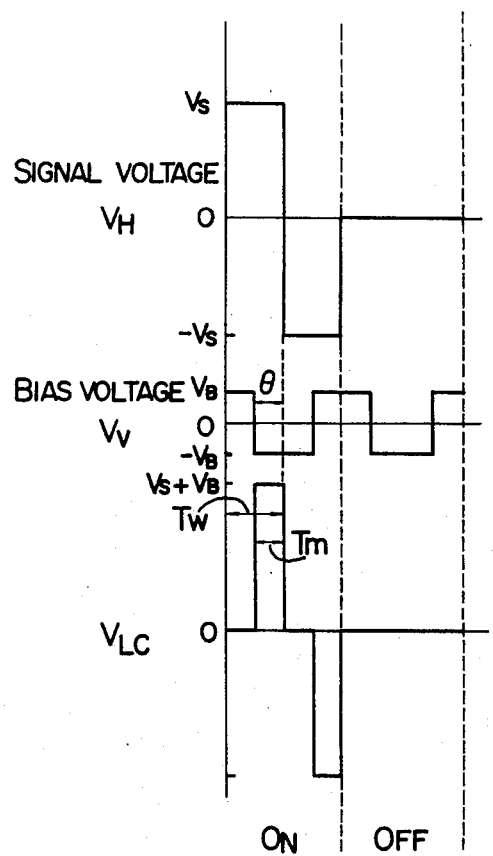
FIG. 16a is a waveform diagram illustrating a manner of displaying halftone by applying pulse phase modulation to the bias voltage applied to the display panels shown in FIGS. 7a and 7b.
Figure 16B:
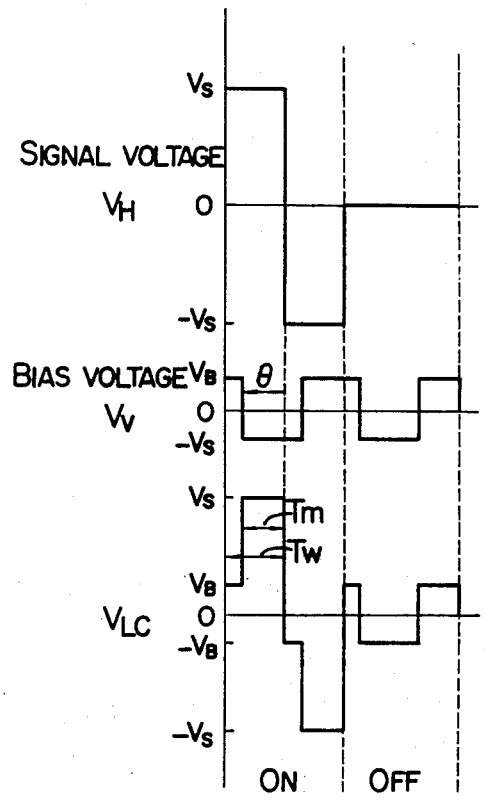
FIG. 16b is a waveform diagram illustrating a manner of displaying halftone by applying pulse phase modulation to the bias voltage applied to the display panel shown in FIG. 9.

In the liquid crystal display panel shown in FIG. 7a, 7b or 9, line-by-line scanning is carried out by the signal voltage $\pm V_S$. This liquid crystal display panel can display halftone when the phase of the bias voltage $\pm V_B$ is suitably modulated. FIG. 16a shows voltage waveforms appearing at various parts of the liquid crystal display panel shown in FIG. 7a or 7b when this principle of phase modulation is applied to the liquid crystal display panel. Referring to FIG. 16a, the phase of the bias voltage of waveform $V_V$ applied to the vertical signal lines is selected to lead by $\theta$ the phase of the signal voltage of waveform $V_H$ is applied to the horizontal scanning lines. In this case, the pulse width $T_m$ of the voltage of waveform $V_{LC}$ applied across the liquid crystal cell is given by $T_m = T_2 \times \theta/\pi$ where $T_w$ is the pulse width of the signal voltage, and thus, $T_m$ varies in proportion to $\theta$. It is therefore possible to display any desired halftone by suitably varying the value of $\theta$. FIG. 16b shows voltage waveforms appearing at various parts of the liquid crystal display panel shown in FIG. 9 when the phase modulation is applied to the bias voltage. It will be seen that a halftone can be similarly displayed although the waveform $L_{LC}$ of the voltage applied across the liquid crystal cell differs from that shown in FIG. 16a. Practical voltage waveforms appearing at various parts of the liquid crystal display panel will be as shown in FIG. 17 due to the fact that the liquid crystal display panel is subjected to line-by-line scanning by many scanning lines.

Figure 18A:
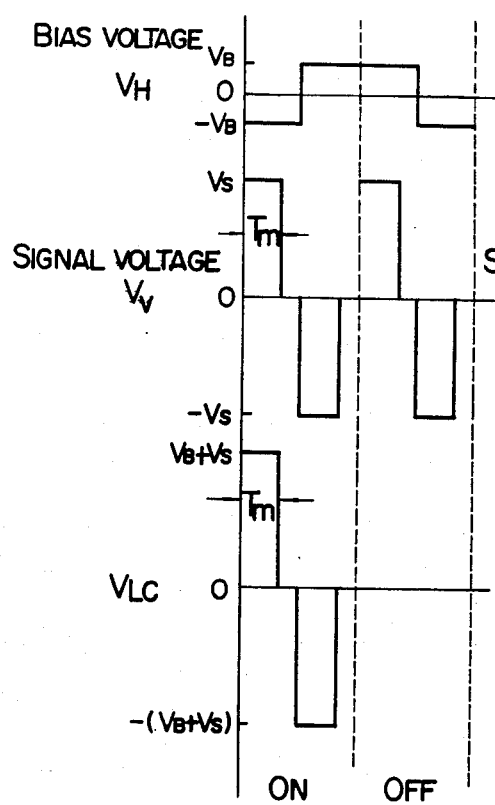
FIGS. 18a and 18b are waveform diagrams illustrating manners of displaying halftone by applying pulse width modulation to the signal voltage applied to the display panels shown in FIGS. 7a and 7b and to the display panel shown in FIG. 10, respectively.
Figure 18B:
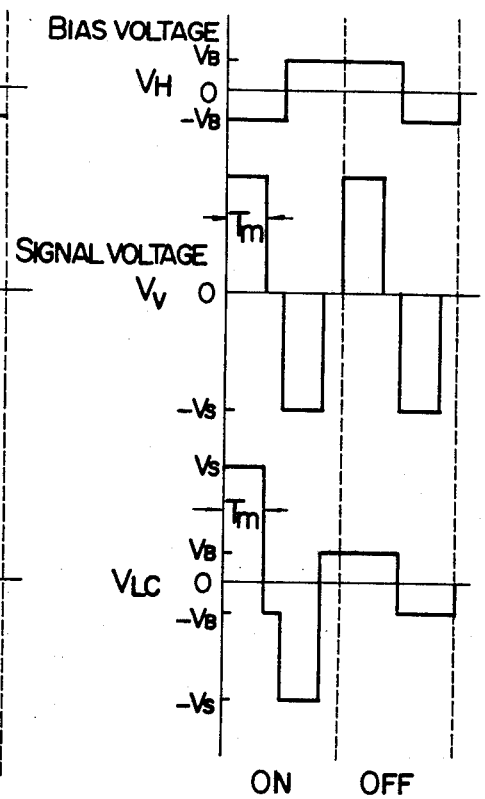

The line-by-line scanning on the liquid crystal display panel shown in FIG. 7a, 7b or FIG. 10 is carried out by modulating the phase of the bias voltage. However, the pulse width of the signal voltage may be modulated to similarly display halftone. FIGS. 18a and 18b show voltage waveforms appearing at various parts of the liquid crystal display panels shown in FIG. 7a or 7b and FIG. 10 respectively when the pulse width modulation is applied to the signal voltage. The respective voltage waveforms $V_{LC}$ applied across the liquid crystal cells are substantially similar to those shown in FIGS. 16a and 16b.

Figure 19:
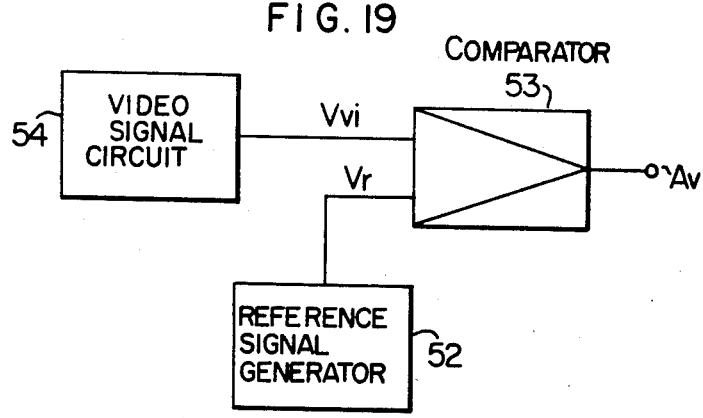
FIG. 19 is a block diagram of a pulse width modulating circuit preferably used in conjunction with the circuit shown in FIG. 14.
Figure 20:
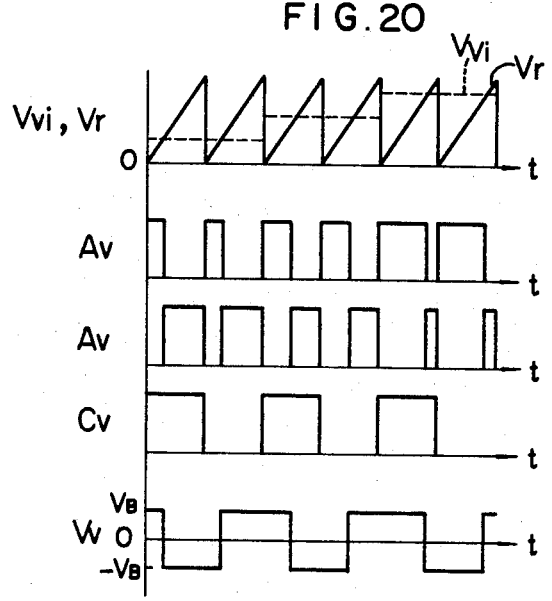
FIG. 20 shows waveforms appearing at various parts of the circuit shown in FIG. 19.

FIG. 19 shows a pulse width modulating circuit which is preferably used for modulating the pulse width of the address signal $A_V$ applied to the actuating circuit shown in FIG. 14. Referring to FIG. 19, a reference signal $V_r$ and a video signal $V_w$ are applied respectively from a reference signal source 52 and a video signal circuit 54 to a comparator 53 to obtain a signal $\overline{A_V}$ having a modulated pulse width as shown in FIG. 20. This signal $\overline{A_V}$ is passed through an inverter to obtain an address signal $A_V$. When the address signal $A_V$ and a clock signal $C_V$ shown in FIG. 20 are applied to the actuating circuit of FIG. 14, a vertical signal $V_V$ as shown in FIG. 20 is obtained. This vertical signal corresponds to the vertical signal $V_V$ shown in FIG. 17.

The above description has referred to the display of halftone by modulating the pulse width of the voltage $V_{LC}$ applied across the liquid crystal cell. However, halftone can also be displayed by modulating the pulse amplitude of the voltage $V_{LC}$. According to the basic structures of the liquid crystal display panels described with reference to FIGS. 7a and 7b, the voltage $V_{LC}$ applied across the liquid crystal cell is $\pm (V_S + V_B)$ which is the sum of the amplitudes of the signal voltage and bias voltage. Therefore, halftone can be displayed by modulating the pulse amplitude of at least one of the signal voltage and bias voltage. FIG. 21 shows voltage waveforms appearing at various parts of the display panel shown in FIG. 7a or 7b when the pulse amplitude of the signal voltage is modulated. This pulse amplitude modulation can be easily achieved by modulating the signal voltage $\pm V_S$ applied to the actuating circuit of FIG. 14 according to the level of a video signal.

In the liquid crystal display panel shown in FIG. 10, line-by-line scanning is carried out by modulating the phase of the bias voltage. In this case, display of halftone by amplitude modulation can be attained only when the pulse amplitude of the signal voltage is modulated. Operating voltage waveforms in such a case are substantially similar to those shown in FIG. 21.

What is claimed is:

1. A liquid crystal display device comprising:
 a series circuit of a liquid crystal cell and an electronic switch, said electronic switch having a double threshold characteristic in which the resistance of said electronic switch is changed over from a high level to a low level when the absolute value of a voltage applied thereacross exceeds a predetermined value;
 means for applying an ac signal voltage to one end of said series circuit; and
 means for applying an ac bias voltage to the other end of said series circuit,
 whereby said electronic switch is controlled depending on the relation between the phase of said as signal voltage and that of said ac bias voltage so that said liquid crystal cell is excited for display when the resistance of said electronic switch takes the low level.

2. A liquid crystal display device as claimed in claim 1, wherein a load resistor is connected in parallel with said liquid crystal cell and has a resistance value equivalent to or lower than that of said liquid crystal cell.

3. A liquid crystal display device as claimed in claim 1, wherein a plurality of picture elements each including said series circuit of said liquid crystal cell and said electronic switch are arranged in matrix form to constitute a liquid crystal display panel having a group of first electrodes arranged in rows and a group of second electrodes arranged in columns, and said ac signal voltage is applied to one of said first and second electrode groups, while said ac bias voltage is applied to the other said electrode group.

4. A liquid crystal display device as claimed in claim 2, wherein a plurality of picture elements each including said series circuit of said liquid crystal cell and said electronic switch and said load resistor connected in parallel with said series circuit are arranged in matrix form to constitute a liquid crystal display panel having a group of first electrodes arranged in rows and a group of second electrodes arranged in columns, and said ac signal voltage is applied to one of said first and second electrode groups, while said ac bias voltage is applied to the other said electrode group.

5. A liquid crystal display device as claimed in claim 3, wherein said ac signal voltage is applied in the form of an intermittent pulse signal, and the pulse width of said pulse signal is controlled by an external signal so as to modulate the pulse width of the ac voltage applied across said liquid crystal cells for displaying halftone.

6. A liquid crystal display device as claimed in claim 4, wherein said ac signal voltage is applied in the form of an intermittent pulse signal, and the pulse width of said pulse signal is controlled by an external signal so as to modulate the pulse width of the ac voltage applied across said liquid crystal cells for displaying halftone.

7. A liquid crystal display device as claimed in claim 3, wherein the phase of said ac bias voltage is controlled by an external signal so as to modulate the pulse width of the ac voltage applied across said liquid crystal cells for displaying halftone.

8. A liquid crystal display device as claimed in claim 4, wherein the phase of said ac bias voltage is controlled by an external signal so as to modulate the pulse width of the ac voltage applied across said liquid crystal cells for displaying halftone.

9. A liquid crystal display device as claimed in claim 3, wherein the amplitude of at least one of said ac signal voltage and said ac bias voltage is controlled by an external signal so as to modulate the amplitude of the ac voltage applied across said liquid crystal cells for displaying halftone.

10. A liquid crystal display device as claimed in claim 4, wherein the amplitude of at least one of said ac signal voltage and said ac bias voltage is controlled by an external signal so as to modulate the amplitude of the ac voltage applied across said liquid crystal cells for displaying halftone.

11. A liquid crystal display device comprising:
 a liquid crystal cell;
 means for applying an ac signal voltage to said liquid crystal cell through an electronic switch having a double threshold characteristic in which the resistance of said electronic switch is changed over from a high level to a low level when the absolute value of a voltage applied thereacross exceeds a predetermined value; and
 means for applying an ac bias voltage to said liquid crystal cell through a load resistor,
 whereby said electronic switch is controlled depending on the relation between the phase of said ac signal voltage and that of said ac bias voltage so that said liquid crystal cell is excited for display when the resistance of said electronic switch takes the low level.

12. A liquid crystal display device as claimed in claim 11, wherein a plurality of picture elements each including said liquid crystal cell, said electronic switch and said load resistor connected together are arranged in matrix form to constitute a liquid crystal display panel having a group of first electrodes arranged in rows and a group of second electrodes arranged in columns, and said ac signal voltage is applied to one of said first and second electrode groups, while said ac bias voltage is applied to the other said electrode group.

13. A liquiid crystal display device as claimed in claim 12, wherein said ac signal voltage is applied in the form of an intermittent pulse signal, and the pulse width of said pulse signal is controlled by an external signal so as to vary the effective value of the ac voltage applied across said liquid crystal cells for displaying halftone.

14. A liquid crystal display device as claimed in claim 12, wherein the phase of said as bias voltage is controlled by an external signal so as to modulate the effective value of the ac voltage applied across said liquid crystal cells for displaying halftone.

15. A liquid crystal display device comprising:
 first and second control terminals;
 a series circuit of a liquid crystal cell and an electronic switching device connected in series between said first and second control terminals, said electronic switching device having an applied voltage versus current flow characteristic defining the effective resistance of said switching device such that the effective resistance of said switching device presents a relatively high impedance value upon the application thereacross of a voltage the absolute value of which is less than a prescrived threshold value, and presents a relatively low impedance value upon the application of a voltage thereacross being at least equal to said prescribed threshold value;

means for applying an ac signal voltage to said first control terminal;

means for applying an ac bias voltage to said second control terminal; and means for controlling the phase of said ac bias voltage with respect to the phase of said ac signal voltage such that for out-of-phase conditions of said ac bias an ac signal voltages, the absolute value of the resultant voltage across said switching device is at least equal to said prescribed threshold value and a relatively low impedance is presented by said switching device, so that said liquid crystal cell is excited by the voltage between said first and second control terminals, and for in-phase conditions of said ac bias and ac signal voltages, the absolute value of the resultant voltage across said switching device is less than said prescribed threshold value, and a relatively high impedance is presented by said switching device, so that said liquid crystal cell is prevented from being excited by the voltage between said first and second terminals.

16. A liquid crystal display device as claimed in claim 15, wherein a load resistor is electrically connected in parallel with said liquid crystal cell and has a resistance value equivalent to or lower than that of said liquid crystal cell.

17. A liquid crystal display device comprising:
first, second, and third terminals;
a liquid cyrstal cell connected between said second terminal and a source of reference potential;
an electronic switching device connected between said first and second terminals, said electronic switching device having an applied voltage versus current flow characteristic defining the effective resistance of said switching device such that the effective resistance of said switching device presents a relatively high impedance value upon the application thereacross of a voltage, the absolute value of which is less than a prescribed threshold value, and presents a relatively low impedance vaue upon the application of a voltage thereacross being at least equal to said prescribed threshold value;
a resistance element connected between said second and third terminals;
means for applying an ac signal voltage to said first terminal;
means for applying an ac bias voltage to said third terminal; and
means for controlling the phase of said ac bias voltage with respect to the phase of said ac signal voltage such that
for out-of-phase conditions of said ac bias and ac signal voltage, the absolute value of the resultant voltage across said switching device is at least equal to said prescribed threshold value and a relatively low impedance is presented by said switching device, so that said liquid crystal cell is excited by the voltage between said second terminal and said source of reference potential, and
for in-phase conditions of said ac bias and ac signal voltages, the absolute value of the resultant voltage across said switching device is less than said prescribed threshold value, and a relatively high impedance is presented by said switching device, so that said liquid crystal cell is prevented from being excited by the voltage between said second terminal and said source of reference potential.

* * * * *